United States Patent Office 3,433,946
Patented Mar. 18, 1969

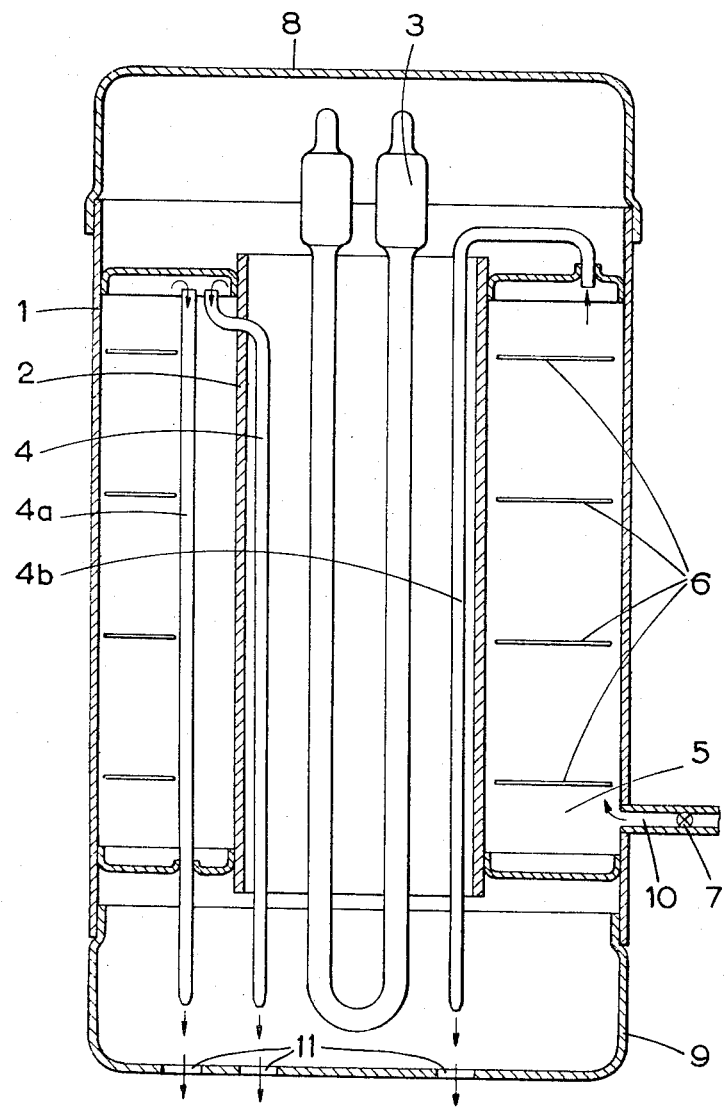

3,433,946
ULTRAVIOLET RADIATION FLUID STERILIZER HAVING MEANS FOR DISCHARGING THE FLUID FREE OF CONTAMINATION
Geoffrey H. E. Hardwick, Slough, England, assignor to Engelhard Hanovia of Canada Limited, a company of Canada
Filed Sept. 15, 1965, Ser. No. 487,544
U.S. Cl. 250—43
Int. Cl. G01n 23/12, 11/00; A61l 3/00
13 Claims

ABSTRACT OF THE DISCLOSURE

Apparatus for sterilizing fluids comprising a sealed vessel, a source of ultraviolet radiation so mounted in the vessel as to provide an annulus through which the fluid to be sterilized is passed from an inlet to an outlet, to atmosphere, the outlet being made of a material which readily transmits radiation so that the fluid is discharged without being contaminated.

---

The invention relates to fluid sterilizers.

It is frequently necessary to sterilise a fluid such, for example, as water or air, before using the fluid in industrial or scientific applications. In this connection the word "sterilisation" means the reduction to an acceptable value of the number/unit fluid volume of live or active bacteria or other micro organisms.

Such sterilisation may be effected using well-known methods, such as heat, chemicals, hard or soft radiation, or by employing ultraviolet radiation.

Ultraviolet radiation is very convenient for many purposes. It is only necessary to ensure that the ultraviolet radiation falls on the organisms so that the organisms are destroyed, or rendered harmless by the photo-chemical changes which the ultraviolet radiation produces in the materials of which the organisms are composed.

Any source of ultraviolet radiation may be employed, but because the photo-chemical changes are most easily produced by those wave lengths which the organisms absorb strongly, the most convenient source is in many instances a low pressure mercury vapour arc tube. Such arc tubes emit strongly at 2537 A. and many bacteria absorb strongly between 2500 and 2700 A.

In order to achieve a specified reduction in the number of organisms of any kind, it is necessary to expose the organisms to radiation at wave lengths which may conveniently be produced and which are of an intensity and for a time which may be experimentally determined.

It will be understood that the fluid and any other media through which the ultraviolet radiation passes must not unduly reduce the strength of the radiation otherwise sterilisation will not be achieved.

Sterilisation of fluids which flow continuously or which discharge intermittently into a closed pipe, presents little difficulty, and apparatus employing ultraviolet radiation may readily be purchased for this purpose.

Where the fluid is discharged to atmosphere and particularly where the flow is intermittent, it is possible that organisms may settle on the outlet or that air contaminated with organisms may be drawn into the outlet when the fluid is not flowing.

It is an object of the invention to provide sterilising apparatus which will be capable of discharging sterilised fluid intermittently into air without the fluid which is discharged being contaminated by any appreciable number of organisms from the outlet at any time while the fluid is flowing, even though the apparatus may not have been in use for some time.

It is a further object of the invention to achieve the first object as set out above without employing more than one source of ultraviolet radiation thus avoiding the expense of providing a second source.

According to the invention sterilising apparatus comprises a sealed vessel in which is centrally mounted a source of ultraviolet radiation extending lengthwise of the vessel and surrounded by a cylindrical tube, the walls of which transmit ultraviolet radiation of wave lengths for use in sterilisation and presenting an annulus between the sealed vessel and the said tube through which the fluid to be sterilised is passed from an inlet or inlets and through the annulus to an outlet or outlets to atmosphere from the sealed vessel, the outlet or outlets to atmosphere being in the form of a pipe or pipes made of a material which readily transmits ultraviolet radiation of the wave lengths for sterilisation and disposed so that they are subject to direct radiation from the said source of ultraviolet radiation.

According to the invention furthermore, baffles may be provided in the annulus in the sealed vessel for the purpose of reducing any tendency for the fluid to pass directly from inlet to outlet as a narrow stream which would reduce the time each particle of fluid was exposed to irradiation. The source of ultraviolet radiation may be so proportioned and disposed that all the contents of the sealed vessel and the outlet pipe or pipes are exposed to the irradiation.

According to the invention furthermore, the control of the flow of fluid through the sealed vessel may preferably be effected by valve means mounted in the inlet or inlets. Alternatively such valve means may be disposed in the outlet pipe or pipes, such valves being preferably made of a material which transmits ultraviolet radiation.

Furthermore since it may be required to vary the temperature of the fluid at the outlet this may be effected by varying the temperature of the fluid at the inlet or by immersing heat exchange pipes in the fluid inside the vessel or by providing heat exchange pipes secured to the wall of the vessel.

The sealed vessel and the top and bottom covers may be made of materials which do not transmit ultraviolet radiation of any wave length which may injure the skin or eyes of any person who is near the apparatus when the ultraviolet irradiation is emitted, and some portion or all these materials may transmit visible light so that the operation of the apparatus may be observed.

According to the invention moreover, the inside of the sealed vessel, with the exception of the surface of the concentric cylinder, may be made of a material which will reflect an appreciable portion of the ultraviolet irradiation which falls on to it.

According to the invention furthermore, means of measuring and/or indicating the intensity of the ultraviolet irradiation may be provided as part of the apparatus and such means may be constructed so that it may operate a valve to prevent further flow of fluid or may give visible or audible warning if the intensity of irradiation falls below a minimum value.

According to the invention furthermore, means may be provided for dismantling the sealed vessel and for removing the ultraviolet source for the purpose of cleaning by removal of any dirt which may have collected on any of the surfaces which transmit or reflect the ultraviolet irradiation.

It will be understood that the materials to be used in the construction of the sterilising apparatus shall be such that they do not give rise to any contamination of the fluid in the apparatus, which would involve any appreciable amount of irradiation such, for example, as compounds of iron in water which absorb ultraviolet irradiation strongly.

The invention is diagrammatically illustrated by way of example in the accompanying drawing which is a sectional elevation of apparatus according to the invention.

In carrying the invention into effect in accordance with the construction illustrated in the drawing, a sealed concentric vessel 1 having top and bottom liquid tight covers 8 and 9 respectively, is formed with a cylindrical open-ended member 2 concentrically mounted lengthwise in the sealed vessel 1 and at each end extending short of the covers 8, 9 respectively. The member 2 may conveniently be of quartz glass. Within the cylinder 2 is mounted a source of ultraviolet irradiation 3 in the form of a low pressure mercury vapour arc tube. The fluid to be treated is passed in through a fluid inlet 10 at the lower part of the sealed vessel 1, under the control of a valve 7 and passes upwardly through the annulus between the cylinder 2 and the sealed vessel 1. Baffles 6 are provided in spaced relation in the annulus or space 5. Outlets 4, 4a, 4b are provided in the annulus or space 5 in the form of parallel pipes extending lengthwise of the vessels through which the irradiation fluid passes downwardly to pass out through openings 11 provided in the lower cover 9 of the sealed vessel 1.

In operation the source of ultraviolet irradiation or tube 3 is caused to emit radiation for a suitable period before the control valve 10 is opened, so that the contents of the vessel and the inlet and outlet pipes may be sterilised. Preferably, but not necessarily, a mechanism may be employed to prevent the fluid from flowing until a determined period has elapsed after the ultraviolet irradiation source has commenced to emit. As soon as the contents of the vessel 1 have been sterilised, the fluid flow may be commenced and interrupted at will, any air drawn into the lower cover being sterilised by irradiation.

I claim:

1. Sterilising apparatus comprising a sealed vessel, a source of ultraviolet radiation centrally mounted in said vessel and extending lengthwise thereof, a cylindrical tube surrounding said source of ultraviolet radiation, walls for said tube which transmit ultraviolet radiation of wave lengths for use in sterilisation, an annulus presented between said sealed vessel and said tube, inlet means in said vessel through which the fluid to be sterilised is passed through the said annulus to outlet means in said sealed vessel to atmosphere, said outlet means being in the form of pipe means made from a material which readily transmits ultraviolet radiation of the wave lengths for sterilisation and disposed so that they are subject to direct radiation from the said source of ultraviolet radiation.

2. Sterilising apparatus according to claim 1, in which the pipe means are made of the same material as the cylindrical tube.

3. Apparatus according to claim 1, in which those parts forming the sealed vessel of the apparatus transmit visible light.

4. Apparatus according to claim 1, in which the inside of the sealed vessel with the exception of the surface of the concentric cylinder is made of a material which will reflect an appreciable portion of the ultraviolet irradiation which falls on it.

5. Apparatus according to claim 1, including means for measuring and indicating intensity of the ultraviolet irradiation, such means being constructed to operate valves to prevent further flow of fluid and to give warning if the intensity of irradiation falls below a minimum value.

6. Apparatus according to claim 1, for permitting the dismantling of the sealed vessel, and for removing the ultraviolet source for the purpose of cleaning.

7. Apparatus according to claim 1, including heat exchange tubes immersed in the fluid inside the sealed vessel.

8. Apparatus according to claim 1, including heat exchange tubes secured to the walls of the vessel.

9. Sterilising apparatus comprising a sealed vessel, a source of ultraviolet radiation centrally mounted in said vessel and extending lengthwise thereof, a cylindrical tube surrounding said source of ultraviolet radiation, walls for said tube which transmit ultraviolet radiation of wave lengths for use in sterilisation, an annulus presented between said sealed vessel and said tube, baffles provided in said annulus for reducing any tendency of the fluid to pass directly from inlet means to outlet means as a narrow stream, thus reducing the time each particle of fluid is exposed to radiation, inlet means in said vessel through which the fluid to be sterilised is passed through the said annulus to outlet means in said sealed vessel to atmosphere, said outlet means being in the form of pipe means made from a material which readily transmits ultraviolet radiation of the wave lengths for sterilisation and disposed so that they are subject to direct radiation from the said source of ultraviolet radiation.

10. Sterilising apparatus comprising a sealed vessel, a source of ultraviolet radiation centrally mounted in said vessel and extending lengthwise thereof, a cylindrical tube surrounding said source of ultraviolet radiation, walls for said tube which transmit ultraviolet radiation of wave lengths for use in sterilisation, an annulus presented between said sealed vessel and said tube, inlet means in said vessel through which the fluid to be sterilised is passed through the said annulus to outlet means in said sealed vessel to atmosphere, valve means for controlling the flow of fluid mounted in the inlet, said outlet means being in the form of pipe means made from a material which readily transmits ultraviolet radiation of the wave lengths for sterilisation and disposed so that they are subject to direct radiation from said source of uttraviolet radiation.

11. Sterilising apparatus comprising a sealed vessel, a source of ultraviolet radiation centrally mounted in said vessel and extending lengthwise thereof, a cylindrical tube surrounding said source of ultraviolet radiation, walls for said tube which transmit ultraviolet radiation of wave lengths for use in sterilisation, an annulus presented between said sealed vessel and said tube, inlet means in said vessel through which the fluid to be sterilised is passed through the said annulus to outlet means in said sealed vessel to atmosphere, valve means for controlling the flow of fluid mounted in the outlet means, said outlet means being in the form of pipe means made from a material which readily transmits ultraviolet radiation of the wave lengths for sterilisation and disposed so that they are subject to direct radiation from the said source of ultraviolet radiation.

12. Sterilising apparatus, comprising a sealed vessel, a source of ultraviolet radiation centrally mounted in said vessel and extending lengthwise thereof, a cylindrical tube surrounding said source of ultraviolet radiation, walls for said tube which transmit ultraviolet radiation of wave lengths for use in sterilisation, an annulus presented between said sealed vessel and said tube, inlet means in said vessel through which the fluid to be sterilised is passed through the said annulus to outlet means in said sealed vessel to atmosphere, valve means for controlling the flow of fluid, said valve means being made of material which transmits ultraviolet radiation, said outlet means being in the form of pipe means made from a material which readily transmits ultraviolet radiation of the wave lengths for sterilisation and disposed so that they are subject to direct radiation from the said source of ultraviolet radiation.

13. Sterilising apparatus, comprising a sealed vessel, a cover for said vessel made of materials which do not transmit ultraviolet radiation which may injure any person near the apparatus when the ultraviolet irradiation is emitted, a source of ultraviolet radiation centrally mounted in said vessel and extending lengthwise thereof, a cylindrical tube surrounding said source of ultraviolet radiation, walls for said tube which transmit ultraviolet radiation of wave lengths for use in sterilisation, an annulus presented between said sealed vessel and said tube, inlet means in said vessel through which the fluid to be sterilised is passed through the said annulus to outlet means in said sealed vessel to atmosphere, said outlet means being in the form of pipe means made from a material which readily transmits ultraviolet radiation of the wave lengths for sterilisation and disposed so that they are subject to direct radiation from the said source of ultraviolet radiation.

References Cited

UNITED STATES PATENTS

| 1,325,214 | 12/1919 | Snelling | 250—43 |
| 2,298,124 | 10/1942 | Hartman | 250—43.5 |
| 2,669,661 | 2/1954 | Riddiford et al. | 250—43 |
| 2,830,016 | 4/1958 | Cier et al. | 250—43 |
| 3,182,193 | 5/1965 | Ellner et al. | 250—43 |

RALPH G. NILSON, *Primary Examiner.*

A. L. BIRCH, *Assistant Examiner.*

U.S. Cl. X.R.

21—102; 250—43.5, 46, 47, 48

PO-1050
(5/69)

UNITED STATES PATENT OFFICE
CERTIFICATE OF CORRECTION

Patent No. 3,433,946            Dated March 18, 1969

Inventor(s) Geoffrey H. E. Hardwick

It is certified that error appears in the above-identified patent and that said Letters Patent are hereby corrected as shown below:

Column 1, after line 8, insert --Claims priority, application Great Britain, September 15, 1964

37681/64--

SIGNED AND
SEALED
FEB 24 1970

(SEAL)
Attest:

Edward M. Fletcher, Jr.
Attesting Officer

WILLIAM E. SCHUYLER, JR.
Commissioner of Patents